United States Patent
Onica et al.

(10) Patent No.: US 11,833,942 B2
(45) Date of Patent: Dec. 5, 2023

(54) VEHICLE SEAT AIR DISTRIBUTION DEVICE

(71) Applicant: GENTHERM INCORPORATED, Northville, MI (US)

(72) Inventors: Madalina Onica, Northville, MI (US); Zoran Panic, Windsor (CA); Ajay Murgod, Novi, MI (US)

(73) Assignee: GENTHERM INCORPORATED, Northville, MI (US)

( * ) Notice: Subject to any disclaimer, the term of this patent is extended or adjusted under 35 U.S.C. 154(b) by 0 days.

(21) Appl. No.: 17/770,113

(22) PCT Filed: Dec. 15, 2020

(86) PCT No.: PCT/US2020/065039
§ 371 (c)(1),
(2) Date: Apr. 19, 2022

(87) PCT Pub. No.: WO2021/126813
PCT Pub. Date: Jun. 24, 2021

(65) Prior Publication Data
US 2022/0388432 A1  Dec. 8, 2022

Related U.S. Application Data

(60) Provisional application No. 62/951,305, filed on Dec. 20, 2019.

(51) Int. Cl.
*B60N 2/56* (2006.01)
*B60N 2/06* (2006.01)

(52) U.S. Cl.
CPC .............. *B60N 2/5642* (2013.01)

(58) Field of Classification Search
CPC ...... B60N 2/5642; B60N 2/5657; A47C 7/744
See application file for complete search history.

(56) References Cited

U.S. PATENT DOCUMENTS

| 8,777,320 B2 | 7/2014 | Stoll et al. | |
| 11,318,869 B2* | 5/2022 | Greenwood | B60N 2/5657 |
| 11,613,189 B2* | 3/2023 | Murgod | B60N 2/5642 |
| | | | 297/180.14 |
| 2008/0111403 A1 | 5/2008 | Ulbrich et al. | |
| 2017/0136926 A1 | 5/2017 | Dry et al. | |

(Continued)

FOREIGN PATENT DOCUMENTS

| CN | 106231959 A | 12/2016 |
| CN | 106470872 A | 3/2017 |

(Continued)

OTHER PUBLICATIONS

International Search Report and Written Opinion dated Mar. 12, 2021, for International Application PCT/US2020/065039.

(Continued)

*Primary Examiner* — Shin H Kim
(74) *Attorney, Agent, or Firm* — The Dobrusin Law Firm, P.C.

(57) ABSTRACT

An air distribution device that includes a seat plate. The seat plate includes one or more cushion engaging features. The one or more cushion engaging features are configured to engage one or more corresponding plate engaging features provided on a seat cushion of a vehicle seat.

20 Claims, 4 Drawing Sheets

(56) References Cited

U.S. PATENT DOCUMENTS

| | | | |
|---|---|---|---|
| 2018/0134193 A1 | 5/2018 | Yang et al. | |
| 2021/0339661 A1* | 11/2021 | Pacilli | B60N 2/5642 |
| 2022/0055512 A1* | 2/2022 | Zhang | B60N 2/5657 |

FOREIGN PATENT DOCUMENTS

| | | |
|---|---|---|
| CN | 107847056 A | 3/2018 |
| CN | 107914612 A | 4/2018 |
| CN | 110406439 A | 11/2019 |
| DE | 202009017383 U1 | 3/2010 |
| WO | 2019/048926 A1 | 3/2019 |
| WO | 2019/112823 A1 | 6/2019 |

OTHER PUBLICATIONS

Chinese Office Action dated Aug. 31, 2023, for Chinese Patent Application No. 202080079176.4.

\* cited by examiner

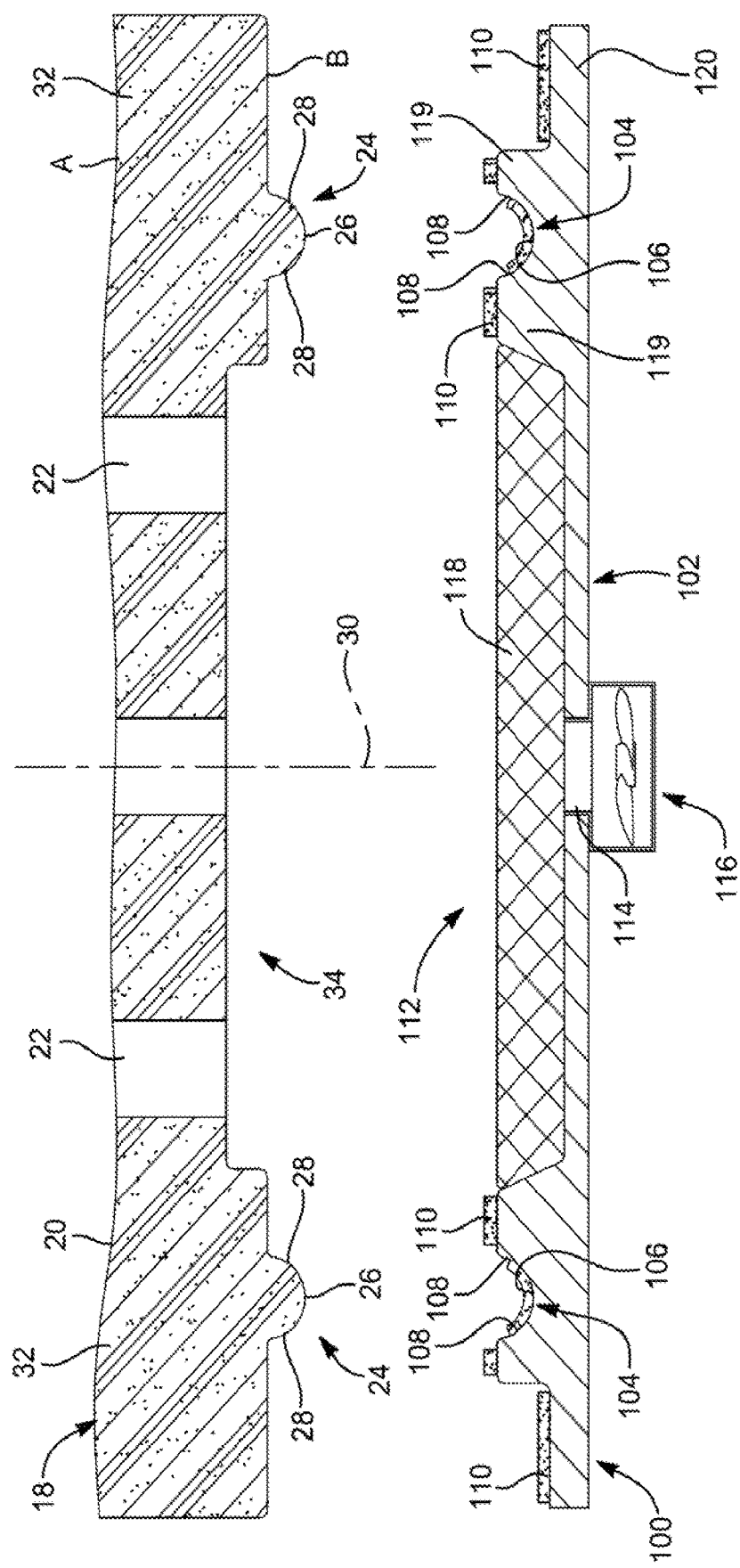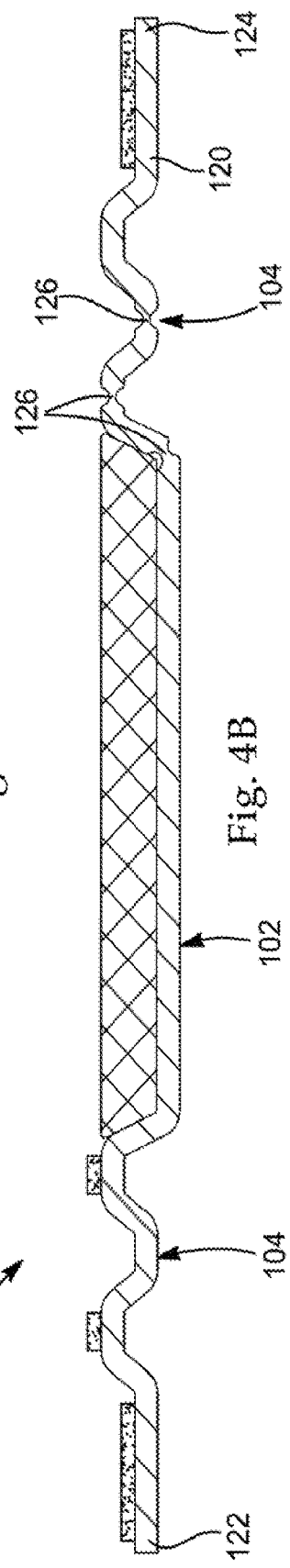

VEHICLE SEAT AIR DISTRIBUTION DEVICE

CROSS-REFERENCE TO RELATED APPLICATIONS

This application is a US National Stage Entry of PCT/US2020/065039, filed on Dec. 15, 2020, which claims priority to U.S. 62/951,305 filed on Dec. 20, 2019.

FIELD

These teachings relate to an air distribution device for connecting an air mover to a vehicle seat.

BACKGROUND

Some vehicle seats include features for improving occupant comfort. For example, some vehicle seats include one or more air movers or fans for moving air towards and/or away from an occupant of the vehicle seat.

To further improve occupant comfort, while also reducing weight and required packaging space, it may be desirable to improve the current state of the art. For example, it may be desirable to have an air distribution device for connecting an air mover to a vehicle seat that includes fewer components than other known air distribution devices. It may be desirable to have an air distribution device that is easier to handle and install during vehicle seat assembly compared to other known air distribution devices.

SUMMARY

These teachings provide an air distribution device that includes a seat plate. The seat plate includes one or more cushion engaging features. The one or more cushion engaging features are configured to engage one or more corresponding plate engaging features provided on a seat cushion of a vehicle seat. The one or more cushion engaging features are configured to engage the one or more plate engaging features to directly connect together the seat plate and the cushion.

These teachings provide an air distribution device or seat plate for connecting an air mover to a vehicle seat. The seat plate is configured to directly attach to a bottom of back side of a cushion of the vehicle seat. Accordingly, the distribution device or seat plate according to these teachings includes fewer components than other known air distribution devices. The distribution device or seat plate according to these teachings is easier to handle an install during vehicle seat assembly than other known air distribution devices.

BRIEF DESCRIPTION OF THE DRAWINGS

FIG. 4A is an exploded, cross-sectional view of a cushion of the vehicle seat and the air distribution device.

FIG. 4B is a cross-sectional view of an air distribution device.

DETAILED DESCRIPTION

Figure 1:
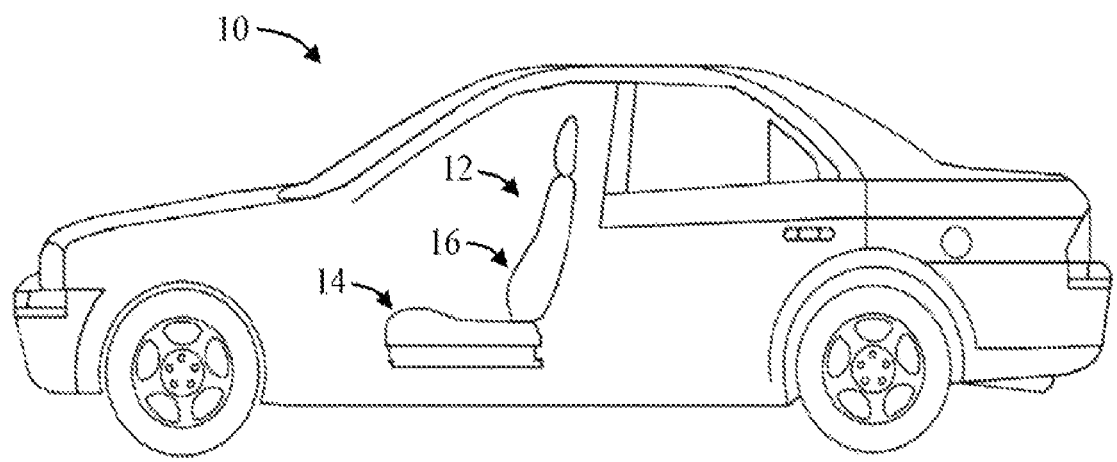
FIG. 1 illustrates a vehicle and a vehicle seat.

Vehicle as used herein may be any vehicle. For example, the vehicle may be a passenger car or truck, a motor home, train, airplane, boat, off-road vehicle, etc.

Vehicle seat as used herein may be any seat or device that may be used to support an occupant or goods. The vehicle seat may include one or more cushions on which or against which an occupant or goods may be seated, stored, and/or transported. The vehicle seat may be a front seat (driver and/or passenger seat), a back seat, a bench, or a combination thereof. The vehicle seat may also be used in non-vehicular applications, such as in a home or office environment. The seat may include a seating portion, a backrest portion, a head rest portion, or a combination thereof. Two or more of these portions may be combined into a single, integral portion (for example, the seating portion and the backrest portion may be one portion, the backrest portion and the head rest portion may be one portion. In some configurations, the seating portion, backrest portion, and headrest portion may be a single portion. In other configurations, the seating portion, backrest portion, and headrest portion may be individual portions that are connected or joined together to form the vehicle seat.

The vehicle seat may include one or more cushions. A cushion may function to support an occupant, goods, or both. The cushion may extend over, against, or on top of a vehicle seat. The cushion may be made of an open cell foam, a closed cell foam, or both. The cushion may be located below or surrounded by a trim or outer later. The trim or outer layer may be what directly contacts the occupant or goods. The trim or outer layer may be cloth, leather, plastic, etc. The cushion may include one or more holes or air channels to allow air to flow between an A-side and a B-side of the cushion. The cushion holes may have a cross-section that increases or decreases between top or A-side side and the rear or bottom side or B side. The air may be moved in either direction, from an A-side to a B-side of the cushion, from the B-side to the A-side of the cushion, or both. The air may be moved by one or more air movers or fans.

The cushion comprises one or more plate engaging features. The one or more plate engaging features are configured to cooperate with one or more corresponding cushion engaging features of the seat plate to directly connect together and maintain a connection between the cushion and the seat plate. The one or more plate engaging features are configured to cooperate with one or more cushion engaging features of the seat plate to connect together and maintain a sealed or fluid resistant or fluid proof or fluid tight or air impermeable connection between the cushion and the seat plate. This means that fluid or air is restricted or prevented from escaping or traveling between the one or more cushion engaging features and the corresponding engaged plate engaging features. The one or more plate engaging features are configured to cooperate with one or more cushion engaging features of the seat plate to form a labyrinth construction.

The one or more plate engaging features may be formed or made from same material as the cushion or from a different material as the rest of the cushion. The one or more plate engaging features may be attached to the cushion with one or more adhesives or fasteners. For example, the one or more plate engaging features may be attached to the cushion via welding; pushpins, screws, or other similar fasteners; tape such as a PSA (pressure sensitive adhesive); and the like.

The one or more plate engaging features may be located at any portion or surface of the cushion. For example, the one or more plate engaging features may be located on a lower surface or B-side of the cushion (that opposes the upper surface of the cushion) or on one or both of the side surfaces of the cushion that extend between and connect the lower and upper surfaces of the cushion. The one or more plate engaging features may be located along the edges or perimeter of the cushion, in a middle region or center line of the cushion, or both. The one or more plate engaging features may surround a recessed region of the cushion that is configured to receive an air mover, a support or spacer layer, or both. The plate engaging features may surround a perimeter of the recessed region. The plate engaging features may be located within the recessed region of the cushion.

The one or more plate engaging features may be one or more projections, barbs, tabs, fingers, prongs, convexities, or other similar protrusions that extend away from the B-side, bottom, or lower surface of the cushion. The one or more projections may have any shape, such as, for example: a flat or planar top, a rounded or curved top, a mushroom or flared top, flat, planar or tapered sides, rounded sides, one or more undercuts, barbs, prongs, fingers, or teeth to bite into the plate or cushion engaging features.

The one or more plate engaging features may be one or more voids, holes, apertures, recesses, reliefs, undercuts; or any combination thereof. The one or more recesses may have any shape, such as, for example: a flat or planar bottom, a rounded or curved bottom, a mushroom or flared bottom, flat, planar or tapered sides, rounded sides, one or more undercuts, barbs, or teeth to bite into the plate engaging features.

The air distribution system may function to deliver, guide, or remove air towards/from a vehicle seat or occupant. The air distribution system may be located anywhere in the vehicle, but preferably in, under, or behind a cushion, a bun, a seating portion, a backrest portion, or a combination thereof. The air distribution system may include one or more air movers, one or more seat plates, or both. The air distribution system may be configured to directly attach to a bottom or backside of a cushion of a vehicle seat.

One or more adhesives may be provided between one or more features of the seat plate and the cushion to directly connect or attach the seat plate and the cushion. The adhesive may function to join or bond together the seat plate and cushion, spacer layer and plate, air mover and plate, or a combination thereof. The adhesive may be virtually any suitable adhesive. For example, the adhesive may be pressure sensitive adhesive (PSA), a resin, hot melt, epoxy, hot glue, a spray adhesive, polyurethane, tape, a double-sided tape, or a combination thereof. Preferably, the adhesive functions to provide a fluid tight or fluid resistant seal so that air is prevented from leaking or flowing between the joints or contact areas of the seat plate and cushion, the air mover and the seat plate, or a combination thereof. In some configurations, the adhesive may function primarily to provide a fluid tight or resistant seal and less to join or bond together the seat plate and cushion, spacer layer and plate, air mover and plate, or a combination thereof.

The air distribution system may include one or more spacers or spacer layers. The one or more spacers or spacer layers may function to move, deflect, guide, and/or distribute a flow of air. The one or more spacer layers may prevent crushing of the one or more air movers when an occupant or load is in or near the cushion or vehicle seat. The one or more spacers or spacer layers may prevent deflection of the cushion, the air distribution device, the seat plate, or a combination thereof so that a flow of air between the cushion and the air mover is neither restricted nor blocked. The one or more spacers or spacer layers may be received in a cavity, recess, or opening defined in the cushion and/or in the seat plate. The one or more spacers or spacer layers may be made form an elastic, flexible, soft, springy and/or supporting material, such as rubber, silicon, foam, cellulose, textiles, paper, and the like. The one or more spacers or spacer layers may include one or more baffles, ribs, projections, bumps, mesh, or other 3D structures. The one or more spacers or spacer layers may be similar to the spacers disclosed in commonly owned U.S. Pat. No. 8,777,320 B2, which is hereby incorporated by reference in its entirety for all purposes.

The air distribution system may include one or more air movers. One or more air movers may be connected to an aperture(s) defined in the seat plate. The air mover may be connected to the seat plate with one or more adhesives or snap rings. An air mover may be any device or combination of device configured or operable to move air. The air mover may increase a flow, speed, or velocity of the air. The air mover may decrease a flow, speed, or velocity of the air. The air mover may be a fan. The air mover may be a radial fan. The air mover may be an axial fan. The air mover may direct air from one or more sources of air. The one or more sources of air may be a heating source providing warm air, a cooling source providing cold air, or a source of ambient air providing air that is at generally the same temperature as the cabin of the vehicle.

The air distribution system may include one or more air seat plates. The seat plate may function to connect an air mover to a cushion of a vehicle seat and assist in transporting air through the cushion. The seat plate may be a rigid structure or a flexible structure. The seat plate may be made of or include a polypropylene, polymer, plastic, metal, a thermoset, an elastomer, high density polyethylene (HDPE); acrylonitrile butadiene styrene (ABS), a combination thereof, or other air-impermeable materials. The seat plate may be vacuum formed, plastic injection molded, made of a single piece, or a combination thereof. The seat plate may be from the same material as the cushion, or from a different material from the cushion. The seat plate may be a metal stamping. The seat plate may be part of the seat frame. The seat plate may be the seat frame that is fastened to the floor of the vehicle. The seat frame may be part of the suspension of the seat. The suspension may include one or more springs or flexible wires. The seat plate may be 3D printed using materials that are plastic, metal, or both. The seat plate may be a flexible substrate, a bag, a portion of a bag, or a combination thereof. The seat plate may be a single piece or comprise multiple pieces attached together. The seat plate may include one or more baffles, spacers, or spacer layers to assist with guiding or deflecting air and/or prevent crushing or blocking of an outlet or inlet of an air mover. The seat plate may be free of a top surface or layer. A bottom or back surface of the cushion may form or function as the top surface or layer to cover the seat plate after the cushion and the seat plate are connected together with the one or more cushion and plate engaging features.

The seat plate comprises one or more cushion engaging features. The one or more cushion engaging features are configured to cooperate with one or more corresponding plate engaging features of the cushion to directly connect together and maintain a connection between the cushion and the seat plate. The one or more cushion engaging features are configured to cooperate with one or more plate engaging features of the cushion to connect together and maintain a sealed or fluid resistant or fluid proof or fluid tight or air impermeable connection between the cushion and the seat plate. This means that fluid or air is restricted or prevented from escaping or traveling between the one or more cushion engaging features and the corresponding engaged plate engaging features.

The one or more cushion engaging features may be formed or made from same material as the seat plate. The one or more cushion engaging features may be attached to the seat plate with one or more adhesives or fasteners. For example, the one or more cushion engaging features may be attached to the seat plate via welding; pushpins, screws, glue, tape, or other similar fasteners or adhesives; and the like.

The one or more cushion engaging features may be located at any portion or surface of the seat plate. The one or more cushion engaging features may be located along the edges or perimeter of the cushion, in a middle region or center line of the seta plate, or both. The one or more cushion engaging features may be located within or inside a recessed region of the seat plate where the spacer or spacer layer is located. In some configurations, when the spacer layer is integrally formed with the seat plate or attached to a seat plate in a subsequent step, the spacers or spacer layers may include the one or more cushion engaging features.

The one or more cushion engaging features may be one or more voids, holes, apertures, recesses, reliefs, undercuts; or any combination thereof. The one or more recesses may have any shape, such as, for example: a flat or planar bottom, a rounded or curved bottom, a mushroom or flared bottom, flat, planar or tapered sides, rounded sides, one or more undercuts, barbs, or teeth to bite into the plate engaging features.

The one or more cushion engaging features may be one or more projections, barbs, tabs, fingers, prongs, convexities, or other similar protrusions that extend away from the seat plate. The one or more projections may have any shape, such as, for example: a flat or planar top, a rounded or curved top, a mushroom or flared top, flat, planar or tapered sides, rounded sides, one or more undercuts, barbs, or teeth to bite into the plate engaging features.

It is understood that any of the features, elements, components, parts, embodiments, disclosed and/or illustrated herein may be duplicated, omitted, combined with other features and embodiments, or a combination thereof. Moreover, it is understood that a vehicle seat, an distribution system, and/or any other assembly or sub assembly may be formed by combining any of the elements, features, and/or components disclosed herein.

FIG. 1 illustrates a vehicle 10. The vehicle 10 comprises at least one vehicle seat 12. The vehicle seat 12 comprises a seating portion 14 and a backrest portion 16.

Figure 2:
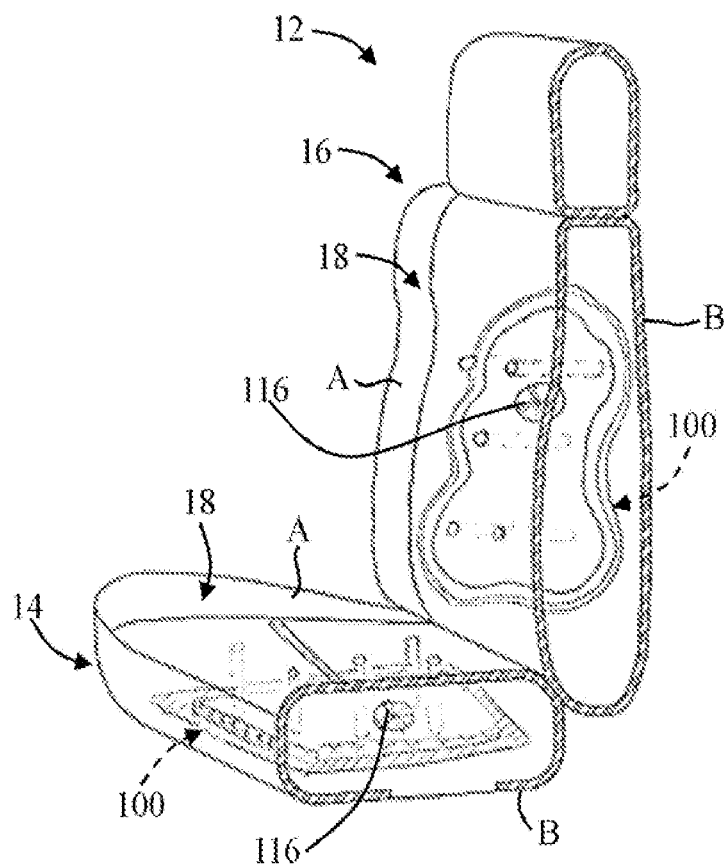
FIG. 2 is a perspective view of the vehicle seat.

FIG. 2 illustrates the vehicle seat 12. Each of the seating portion 14 and the backrest portion 16 comprises a cushion 18. The cushion 18 comprises a top or A-side A and an opposing bottom or B-side B. An air distribution device 100 may be associated with or connected to one or both cushions 18. The vehicle seat 12 may include one or more air distribution devices 100. An air distribution device 100 may be connected or attached to the back or B-side B of the cushion 18 or the seating portion 14, the backrest portion 16, or both. However, it is understood that a vehicle seat 12 may include only one air distribution device 100 in one of the cushions 18 or may have one air distribution device 100 that is attached to both cushions 18.

Figure 3:
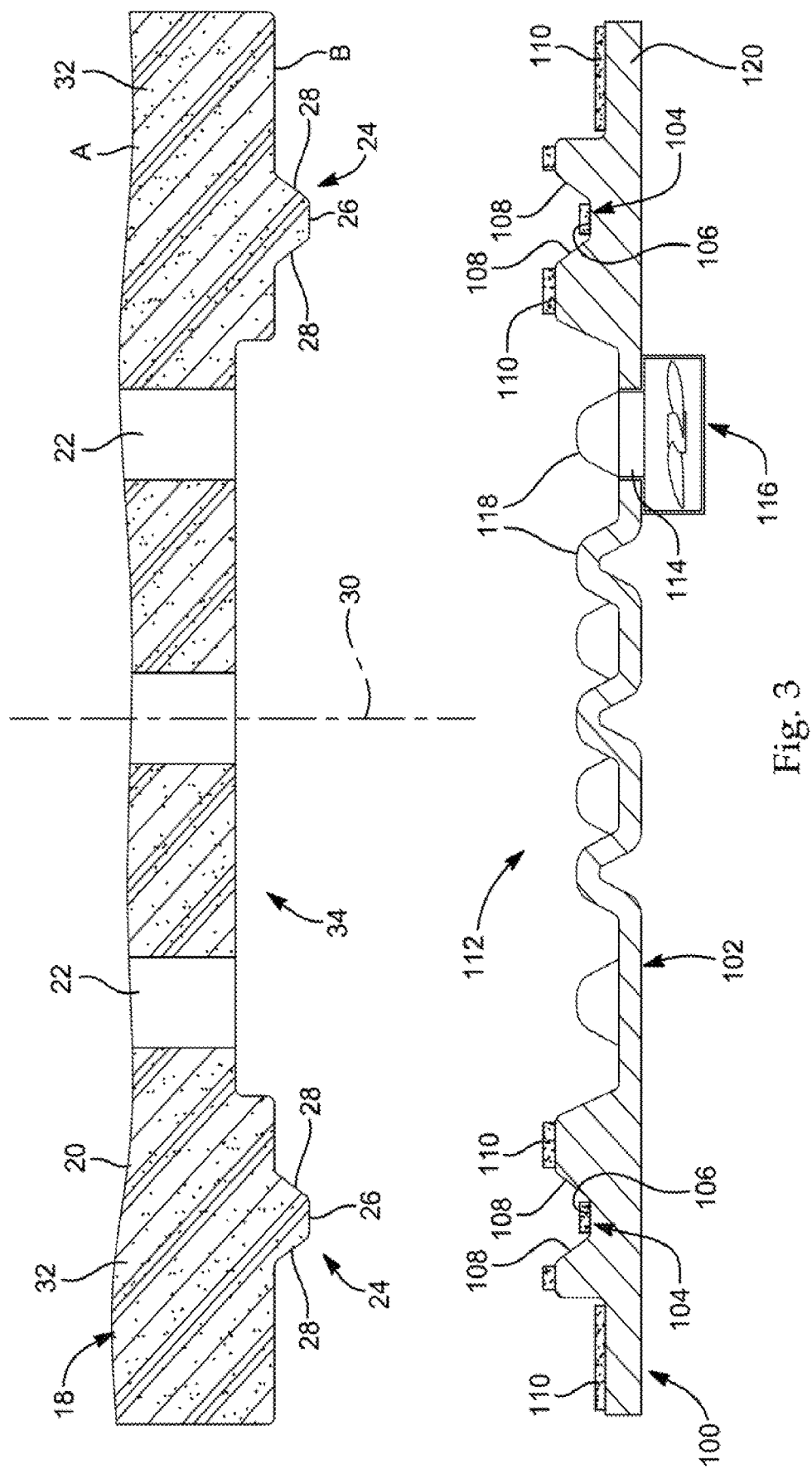
FIG. 3 is an exploded, cross-sectional view of a cushion of the vehicle seat and the air distribution device.

FIGS. 3 and 4A each illustrate a cross section of the cushion 18 of either or both of the seating portion 14 and the backrest portion 16 of the vehicle seat 12. The cushion 18 may be at least partially covered or enclosed by a trim cover or outer layer 20. The cushion 18 comprises one or more air channels 22 that extend at least partially through a thickness of the cushion 18, between the bottom or B-side B of the cushion 18 and the top or A-side A of the cushion 18. The cushion 18 comprises one or more recessed regions 34. The recessed region 34 may be located at a center region thereof and between opposing side cushion bolsters 32. However, in some configurations the recessed region 34 may be offset from a center line 30 of the cushion 18 and arranged closer to one of the side cushion bolsters 32 than the other. The recessed region 34 may be centered in a fore-aft direction (or front-back direction) of the cushion. In other configurations, the recessed region 34 may be offset or moved closer to the fore direction than the aft direction, or vice versa. In other configurations, the cushion 18 may include plural recessed regions. The air channels 22 may be located in the recessed region 34 and/or in the cushion bolster 32 regions. The recessed region 34 may be configured to provide an area to accept on or more features of the seat 12, such as one or more of the spacer layers 118 discussed further below. The recessed region 34 may provide or define spacing and/or a gap between a bottom side of the cushion 18 and an opening 114 defined in the seat plate 102 also discussed further below so that the aperture 114 and/or air mover 116 are not obstructed or blocked when the cushion 18 is compressed, distorted, or deflected after an occupant or goods or other load are acting on the cushion 18 from the A-side A. The aforementioned spacing or gap may be defined in, at, or between a region of the cushion 34 or the recessed region 34 of the cushion 34 and the seat plate 102 or the recessed region 112 of the seat plate 102. The spacing or gap between these features may define one or more air distribution channels 113.

Figure 5:
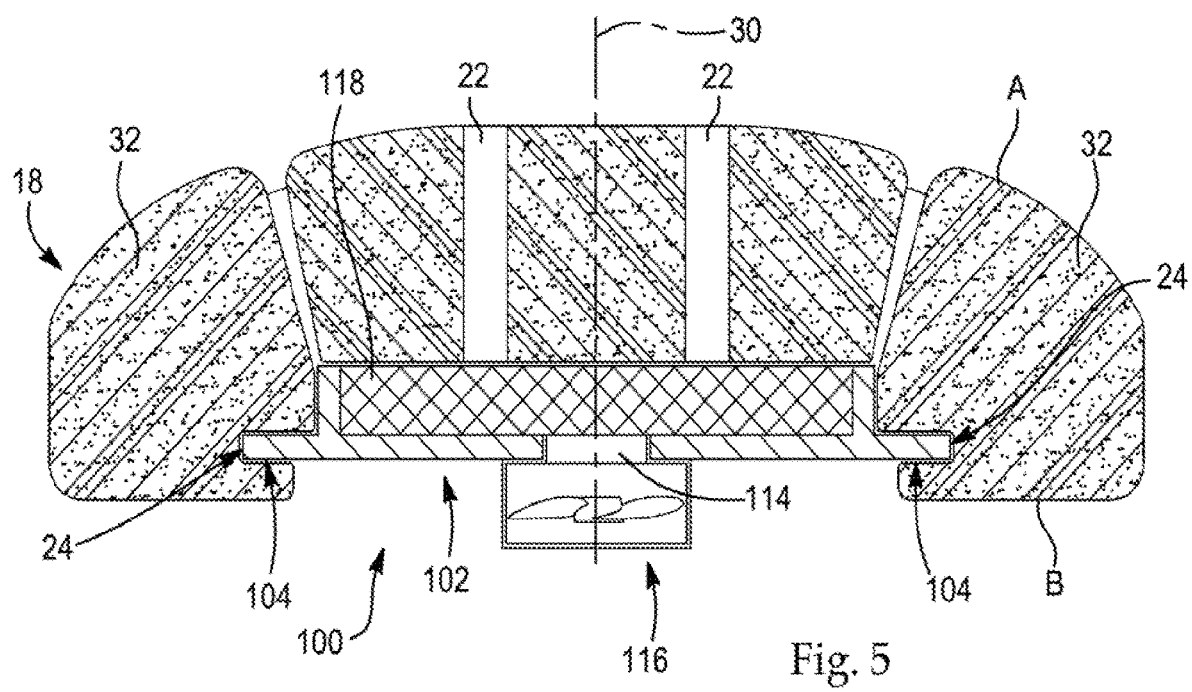
FIG. 5 is an exploded, cross-sectional view of a cushion of the vehicle seat and the air distribution device.

The one or more air distribution channels 3 may be formed or defined after the seat plate 102 and the cushion 34 are engaged or connected together (See FIG. 5, for example). In other words, after the one or more cushion engaging features 104 (described below) engage or connect to or with the one or more corresponding plate engaging features 24 (also described below), the one or more air distribution channels 113 may be defined or formed therebetween. The one or more air distribution channels 113 may provide an area or region for air supplied by the air mover 116 to be distributed to or along a bottom area of the cushion 18 and ultimately distributed to the one or more air channels 22. The one or more air distribution channels 113 may be one large channel or space. Alternatively, the one or more air distribution channels 113 may be plural channels or spaces that are defined or separated by vanes, ribs, projections, standoffs or spacers 118, etc., which may function to guide or direct air flow from the air mover 116 directly to corresponding air channels 22. When operating in a pull mode, the one or more ribs, projections, standoffs or spacers 118, etc., may function to guide or direct air flow from the air channels 22 directly to the air mover 116. The one or more air distribution channels 113 may also provide sufficient spacing between the air mover 116 and a bottom of the cushion 18 so that when a load or occupant is seated on the cushion 18, the cushion 18 does not contact or block the aperture 114, which may undesirably obstruct air flow to or from the air mover 114.

The cushion 18 comprises one or more plate engaging features 24. The plate engaging features 24 may be a projection that projects or extends away from the B-side of the cushion 18. The plate engaging features 24 may be defined by a top surface 26 that is generally flat or planar (FIG. 3) or a top surface 26 that is generally rounded or curved (FIG. 4). In other configurations, the plate engaging features 24 can have any shape or feature disclosed herein. The plate engaging features 24 may have side walls 28 that extend away from the B-side of the cushion 18. The side walls 28 may be generally planar or tapered (FIG. 3) or the side walls 28 may be generally rounded or curved (FIG. 4). In some configurations, a flat-topped 26 projection (FIG. 3) may comprise rounded or curved side walls 28 (FIG. 4) and/or a rounded or curved top 26 (FIG. 4) may comprise planar or tapered side walls 28 (FIG. 3). In some configurations, one or more of the plate engaging features 24 of FIG. 3 may be combined with one or more of the plate engaging features 24 of FIG. 4 or disclosed herein. That is, it is within the scope of this disclosure that the cushion comprises one or more plate engaging features 24 from both FIGS. 3 and 4A, 4B.

The air distribution device 100 comprises a seat plate 102. The seat plate 102 comprises one or more cushion engaging features 104 that are configured to connect with and/or engage the one or more plate engaging features 24 provided on the cushion 18 to attach or connect the air distribution device 100 directly to the cushion 18.

The cushion engaging features 104 may comprise one or more recesses. The cushion engaging features 104 may be defined by a bottom surface 106 that is generally flat (FIG. 3) or a bottom surface 106 that is generally rounded or curved (FIG. 4). The cushion engaging features 104 may include side walls 108 that are generally planar or tapered (FIG. 3) or generally rounded or curved (FIG. 4). In some configurations, a flat-bottomed 106 recess (FIG. 3) may comprise rounded or curved side walls 108 (FIG. 4) and/or a rounded or curved bottom 106 (FIG. 4) may comprise planar or tapered side walls 108 (FIG. 3). In some configurations, one or more of the cushion engaging features 104 of FIG. 3 may be combined with one or more of the cushion engaging features 104 of FIG. 4. The one or more cushion engaging features 104 may be located proximal to an edge 120 of the seat plate 102. The one or more cushion engaging features 104 may be located adjacent to an outer edge or periphery of the seat plate. The one or more cushion engaging features 104 may be located at or near the one or more recessed regions 112. In such a configuration, where the one or more cushion engaging features 104 are located at or in the one or more recessed regions 112 of the seat plate 102, the one or more cushion engaging features 104 may serve multiple functions, including connecting the seat plate to the cushion and to provide structure, walls, or separators to define the one or more air distribution channels 113 discussed above to assist with directing air flow to and from the air mover 116.

The air distribution device 100 may include one or more adhesives 110. The one or more adhesives 110 may be provided between the cushion 18 and the seat plate 102 to connect and maintain a direct connection between the cushion 18 and the seat plate 102. The one or more adhesives 110 may be provided in the areas that the one or more plate engaging features 24 engage the one or more cushion engaging features 104 (i.e., in/on the bottom surfaces, the side walls, the tops, etc.). In some configurations, one or more fasteners, like pins, hook and loop fasteners, screws, rivets, glue, etc. may be used in addition to or in place of the adhesives 110 connect together the cushion 18 and the seat plate 102.

The seat plate 102 comprises a recessed region 112 and an aperture 114. The aperture 114 may be located in the recessed region 112 or outside of the recessed region 112. The recessed region is configured to engage with or connect one or more air movers 116 to the seat plate 102. The recessed region 112 may be located at any portion of the seat plate 102. Preferably, the recessed region 112 is located between or within the cushion engaging features 104. The recessed region 112 is configured to provide an area for fluid to be distributed to the one or more air channels 22 defined in the cushion 18 so that the air can be distributed towards an occupant sitting on the cushion 18 or the seat 12. The recessed region 112 may comprise one or more standoffs or spacers 118. The one or more standoffs or spacers 118 may be attached to the seat plate 102 with one or more adhesives or fasteners, or the one or more standoffs or spacers 118 may be molded or manufactured together with the seat plate 102 (i.e., molded together, co-molded, insert molded, etc.) The one or more standoffs or spacers 118 may be configured to restrict or prevent the B-side of the cushion 18 from collapsing, blocking, or otherwise obstructing the aperture 114 and/or air mover 116 when an occupant is seated or resting against the cushion 18. The one or more standoffs or spacers 118 may be configured to direct an airflow provided by the air mover 116 to the one or more air channels 22 defined in the cushion 18.

The aperture 114 and/or the air mover 116 may be offset to a side of a center axis 30 of the cushion 18 (FIG. 3), or the aperture 114 and/or the air mover 116 may generally aligned with the center axis 30 of the cushion 18 (FIG. 4). The seat plate 102 may include more than one aperture 114 and air mover 116 for pushing or moving air into the air channels 22 and towards the occupant in or near the seat 12, or pulling or suctioning air out of the air channels 22 and away from the occupant in or near the seat 12. While operating in a push mode, when the air mover 116 is moving air towards an occupant in or near the seat 12, the air may be conditioned (i.e., warmer or colder than ambient air in the cabin of the vehicle 12, or the air may be ambient air.

During assembly of the vehicle seat 12 and/or one or both of the seating portion 14 and backrest portion 16, the seat plate 102 can be brought into proximity with the cushion 18 so that the one or more cushion engaging features 104 are aligned with the one or more plate engaging feature 24. The engaging features 24, 104 are then brought into contact with each other such that the plate engaging features 24 mate with or engage the plate engaging features 104. The connection between the engaging features 24, 104 may be a snap-fit or interference fit connection. One or more adhesives 110 may be provided in the region of the engaging feature 24, 104 to assist with creating and/or maintaining the connection between the seat plate 102 and the cushion 18. After the engaging features 24, 104 are engaged, a fluid-tight connection may be achieved between the cushion 18 and the seat plate 102, which may advantageously restrict or prevent air that is moved by the air mover 116 from leaking or flowing between the cushion 18 and the seat plate 102. The use of one or more adhesives 110 may further promote the fluid-tight seal or connection between the cushion 18 and the seat plate 102. Accordingly, air is moved by the air mover 116 through the aperture 114, the recessed region 112, and the one or more air channels 22 in the cushion 18 in a direction towards or away from an occupant of the seat 12.

The seat plate 102 of FIGS. 3 and/or 4A has a cross section or thickness that may vary or is not uniform along a length or width thereof (in contrast to the seat plate 102 of FIG. 4B discussed below). For example, the seat plate 102 of FIGS. 3 and/or 4A may have one or more thicker and thinner regions that extend along a length or width of the plate 102. The thicker regions may be stabilizing regions 119 that may function to stabilize or reinforce the seat plate 102, the cushion, the seat, or a combination thereof. Stabilizing regions 119 may find use or be advantageous in the area(s) of the cushion engaging features 104 to restrict or prevent the engaging features 104 and/or the plate 102 from distorting, bending, and/or flexing, which may assist during installation of the plate 102 to the cushion 18. Stabilizing regions 119 may also assist with retaining a connection between the plate 102 and the cushion 18. The thicker or stabilizing regions may be anywhere on the plate 102, including in the recessed region 112 to support the spacer layer 118, the air mover 116, or both.

The seat plate 102 may have a thickness or cross section that is substantially smaller or less a thickness or cross section of the cushion. However, in some configurations a thickness or cross section of the seat pan may be substantially the same as the cushion, or even greater or larger than thickness or cross section of the cushion.

FIG. 4B illustrates another air distribution device 100 that includes a seat plate 102. The seat plate 102 of FIG. 4B has many of the features described above and below; thus, like features will not be described. It is understood, however, that one or more of any features of the seat plate described herein can be incorporated into the version illustrated and described in FIG. 4B and that any of the feature(s) illustrate and described in FIG. 4B can be incorporated into any of the other seat plates illustrated and described herein. In other words, it is within the scope of this disclosure that a cushion, seat pan, or assembly can be constructed by picking and choosing one or more of the any of the elements illustrated and/or disclosed herein. Moreover, one or more of the elements or features illustrated and/or disclosed herein may be combined with other features disclosed herein; duplicated; eliminated; moved or repositioned; or a combination thereof.

The seat plate 102 of FIG. 4B has a generally or substantially uniform or constant thickness or cross section that extends along or between an entire width and/or length of the plate 102, for example between edges 122, 124. In vehicle position, the edges 122, 124 may be arranged side to side (i.e., cross car direction) and/or may be front to back (i.e., fore aft direction). A seat plate 102 that has a substantially uniform or constant thickness of and/or cross section may provide for the plate 102 to bend, flex, or be movable, formable, and/or deformable to assist in assembly of the plate 102 onto a seat cushion 18. For example, due to tolerance variations of the seat plate 102, cushion engaging features 24, cushion 18, plate engaging feature 24, etc., having a seat plate 102 that can be moved, formed, and/or at least partially deformed/distorted may assist during vehicle seat assembly, especially during aligning and connecting of the engaging features 24, 104.

The seat plate 102 may also include one or more flexing features 126. A flexing feature 126 may function to assist with moving forming, deforming, and/or distorting the plate 102. For example, during installation and/or assembly with the cushion 18 or vehicle seat 12, it may be desirable to be able to at least partially bend or flex one or more areas or regions of the seat plate 102 to assist with engaging the cushion engaging features 104 with the plate engaging features 24 of the cushion 18. Accordingly, the flexing features 126 may be provided in or at regions of the cushion engaging features 104. However, the flexing features 126 may be located anywhere on the plate 102. Additionally, or alternatively, the one or more flexing features 126 may assist with providing for the plate 102 to bend or flex to accommodate cushion movement 18, which may occur when a weight is provided on the cushion 18 (i.e., occupant and/or goods in the vehicle seat 12). The one or more flexing features 126 may be a notch, depression, thinned out section, spring, elastic, metal, plastic, rubber, and/or living hinge defined in the seat plate 102. The one or more flexing regions 126 may be a flexible or bias able material provided in certain areas of the seat plate 102, while other areas of the seat plate 102 may be made or formed from other more rigid or less flexible materials.

FIG. 5 illustrates a cross section of the cushion 18 of either or both of the seating portion 14 and the backrest portion 16 of the vehicle seat 12. The cushion 18 comprises one or more air channels 22 that extend at least partially through a thickness of the cushion 18, between the bottom or B-side B of the cushion 18 and the top or A-side A of the cushion 18.

The cushion 18 comprises one or more plate engaging features 24. The plate engaging features 24 may be a recess, groove, or notch defined in the cushion 18 that extends laterally outward into the cushion 18, away from a center axis 30 of the cushion. The plate engaging features 24 (i.e., the recess, groove, or notch) may have walls that are generally flat, planar, tapered, or curved.

The air distribution device 100 comprises a seat plate 102. The seat plate 102 comprises one or more cushion engaging features 104 that are configured to engage the one or more plate engaging features 24 defined in the cushion 18 to attach or connect the air distribution device 100 to the cushion 18. The one or more cushion engaging features 104 may be projections or tabs that also extend from the seat plate 102 in a direction away from the center axis 30 of the cushion 18. The cushion engaging features 104 or projections include surfaces that complement the plate engaging features 24 of the cushion 18.

The air distribution device 100 comprises an aperture 114, an air mover 116, and one or more stand offs or spacers 118, like the ones described above at FIGS. 3 and 4A, 4B.

With continued reference to FIG. 5, during assembly of the vehicle seat 12 and/or one or both of the seating portion 14 and backrest portion 16, the seat plate 102 is brought into proximity with the cushion 18 so that the cushion engaging features 104 of the seat plate 102 can be slid into the plate engaging features 24 of the cushion 18. For example, assuming the cushion 18 is arranged horizontally on a table, the seat plate 102 can be moved horizontally so that the cushion engaging features 24 slide into the plate engaging features 24 of the cushion 18. Alternatively, the cushion 18 can be moved horizontally so that the plate engaging features 104 slide along or onto the cushion engaging features 104 of the seat plate 102. Alternatively, the bolster or edge regions 32 of the cushion 18 can be moved, deflected, deformed, or moved or pushed away from the center axis 30 of the cushion 18 and the cushion engaging features 104 can be flexed, snapped, or placed into the plate engaging feature 24 of the cushion 18. After the bolster or edge regions 32 of the cushion 18 are relaxed, those portions 32 move back towards the center axis 30, thus retaining or securing the cushion engaging features of the seat plate 102. One or more adhesives (not illustrated) may be provided between or in regions of the engaging features 24, 104 to further promote a fluid-tight seal or connection between the cushion 18 and the seat plate 102. During use, air is moved by the air mover 116 through the aperture 114, and the one or more air channels 22 in the cushion 18 in a direction towards or away from an occupant of the seat 12

Figure 6:
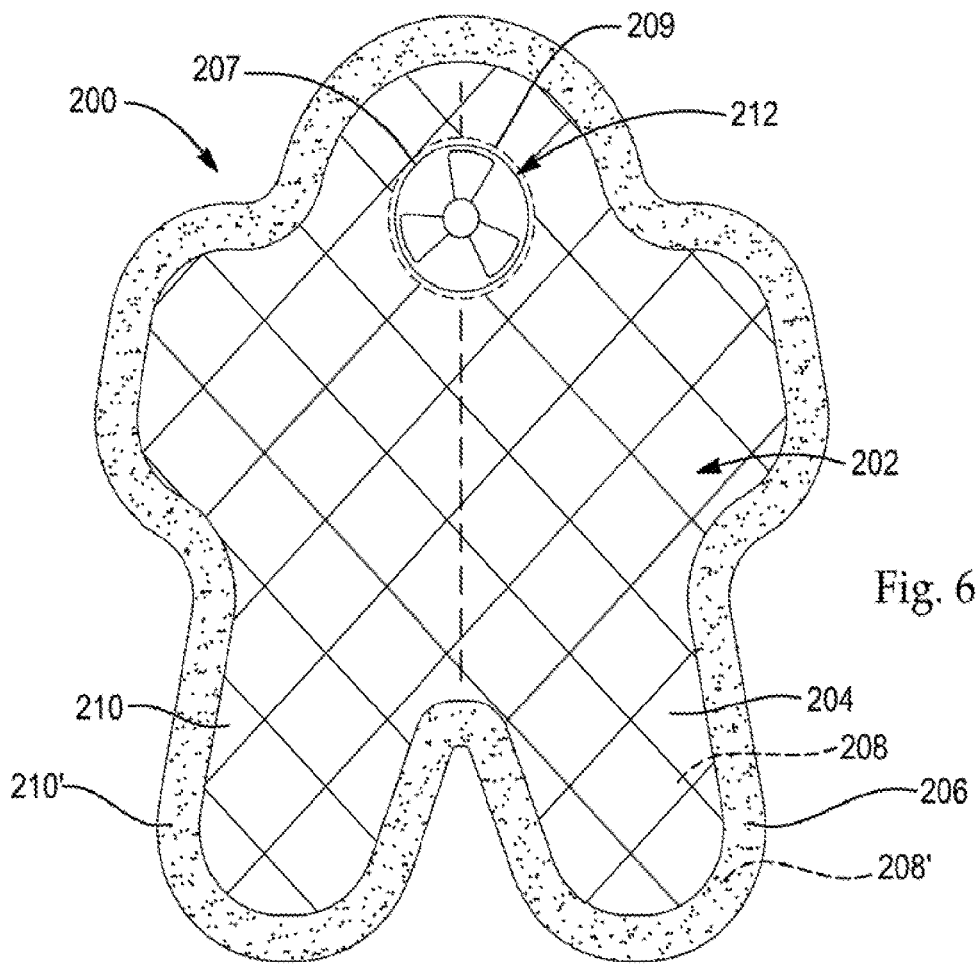
FIG. 6 is a front view of an air distribution device.

FIG. 6 illustrates another air distribution system 100. The air distribution device 100 includes a seat plate 200 that comprises a surface 202 that is configured to be arranged at the B-side B of cushion 18. Surface 202 may have a first area 204 and a second area 206 surrounding the first area 204. The first area 204 may be a recessed region, like the recessed region 112, that is surrounded by area 206 that is elevated relative to the recessed region 204. Each area 204, 206 may be covered with an adhesive 208, 208'. The adhesive 208, 208' may be a pressure sensitive adhesive PSA having a surface side that is adhered or attached to the respective area 204, 206 of the seat plate 200. The opposing side of the adhesive 208, 208' may be covered with a removable covering layer 210, 210. The first area 204 or the recessed region may include an aperture or opening 207. During assembly of the seat plate 200, an air mover 212 can be attached to the aperture or opening 207 in seat plate 200 in a region of the first area 204 or recessed region and secured to the seat plate 200 via a snap ring 209 or other suitable fastener or mounting apparatus. The covering layer 210 can be removed from the first area 204, and one or more standoffs, spacers, or a spacer layers, like those illustrated and described at element 118 of FIGS. 3 and 4A, B, may be pressed down onto the adhesive 208 to attach the one or more standoffs, spacers, or a spacer layer to the seat plate 200. The covering layer 210' can then be removed thus exposing the adhesive 208' in area 206 and the seat plate 102 can be brought into contact with and pressed against the B-side B of a cushion 18 to adhere the area 206 of the seat plate 200 to the B-side B of the cushion 18.

The explanations and illustrations presented herein are intended to acquaint others skilled in the art with the invention, its principles, and its practical application. The above description is intended to be illustrative and not restrictive. Those skilled in the art may adapt and apply the invention in its numerous forms, as may be best suited to the requirements of a particular use.

Accordingly, the specific embodiments of the present invention as set forth are not intended as being exhaustive or limiting of the teachings. The scope of the teachings should, therefore, be determined not with reference to this description, but should instead be determined with reference to the appended claims, along with the full scope of equivalents to which such claims are entitled. The omission in the following claims of any aspect of subject matter that is disclosed herein is not a disclaimer of such subject matter, nor should it be regarded that the inventors did not consider such subject matter to be part of the disclosed inventive subject matter.

Plural elements or steps can be provided by a single integrated element or step. Alternatively, a single element or step might be divided into separate plural elements or steps.

The disclosure of "a" or "one" to describe an element or step is not intended to foreclose additional elements or steps.

While the terms first, second, third, etc., may be used herein to describe various elements, components, regions, layers and/or sections, these elements, components, regions, layers and/or sections should not be limited by these terms. These terms may be used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below", or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The disclosures of all articles and references, including patent applications and publications, are incorporated by reference for all purposes. Other combinations are also possible as will be gleaned from the following claims, which are also hereby incorporated by reference into this written description.

The invention claimed is:

1. An air distribution device comprising:
a seat plate comprising one or more cushion engaging features, the one or more cushion engaging features are configured to engage one or more corresponding plate engaging features provided on a bottom or backside of a seat cushion of a vehicle seat to connect and to maintain a connection between the seat plate and the seat cushion, the seat plate further comprising an aperture for connecting or engaging an air mover to the seat plate, wherein air from the air mover is directed through the seat plate, towards the bottom or the backside of the seat cushion or away from the bottom or the back-side of the seat cushion wherein upon connecting the seat plate to the seat cushion, an air distribution channel or space is formed, the air distribution channel or space is a cavity that is defined between an inside surface of the seat plate and the bottom or backside of the seat cushion, and an air flow generated by the air mover flows into the air distribution channel or space between the inside surface of the seat plate and the bottom or backside of the seat cushion.

2. The air distribution device according to claim 1, wherein the air distribution channel or space is further defined between inwardly facing walls and/or wherein the seat plate comprises an undulating surface in a region of the air distribution channel or space.

3. The air distribution device according to claim 2, wherein the air distribution device comprises a spacer layer between the inwardly facing walls.

4. The air distribution device according to claim 2, wherein the seat plate comprises one or more standoffs in the air distribution channel or space.

5. The air distribution device according to claim 4, wherein the one or more standoffs extend from the inside surface of the seat plate in a direction of the bottom or backside of the seat cushion.

6. The air distribution device according to claim 3, wherein the spacer layer has opposing edges in contact with the inwardly facing walls.

7. The air distribution device according to claim 1, wherein when the air distribution device is viewed in cross-section, the seat plate has a U-shaped structure defining the air distribution channel or space, and the air distribution device comprises a spacer layer provided in the U-shaped structure.

8. The air distribution device according to claim 7, wherein the seat plate is flexible.

9. The air distribution device according to claim 8, wherein the seat plate comprises one or more standoffs in the U-shaped structure.

10. The air distribution device according to claim 1, wherein the aperture is aligned along a center line of the seat cushion, and/or wherein the one or more cushion engaging features comprises a recess and the one or more plate engaging features comprise a projection that is received into the recess, or vice versa.

11. The air distribution device according to claim 10, wherein an adhesive is provided between the recess and the projection.

12. The air distribution device according to claim 1, wherein the or more cushion engaging features of the seat plate are slid into the one or more plate engaging features of the cushion along a bottom surface of the seat cushion and/or along a plane that is offset from the bottom surface of the seat cushion and/or in a generally horizontal direction relative to a seating surface of the vehicle seat.

13. The air distribution channel according to claim 1, wherein the one or more cushion engaging features comprise one or more flexing features, and optionally the one or more flexing features comprise a notch, depression, thinned out section, spring, elastic, metal plastic, rubber, and/or living hinge.

14. The air distribution device according to claim 1, wherein the air distribution device comprises a spacer layer received in a cavity, recess, or opening defined in the cushion and/or in the seat plate.

15. The air distribution device according to claim 1, wherein the seat plate comprises a recessed region, and the aperture is located in the recessed region.

16. The air distribution device according to claim 1, wherein the seat plate comprises one or more thicker and thinner regions that extend along a length or width of the seat plate.

17. The air distribution device according to claim 1, wherein when the air distribution device is viewed in cross-section, the seat plate has a U-shape defining at least a portion of the air distribution channel or space.

18. The air distribution device according to claim 17, wherein the air distribution device has one or more standoffs and/or a spacer layer within the U-shape.

19. The air distribution device according to claim 1, wherein the one or more cushion engaging features are free from engaging air channels defined in or through a thickness of the cushion.

20. The air distribution device according to claim 1, wherein the one or more plate engaging features are arranged laterally outward of one or more air channels that extend in or through a thickness of the cushion.

* * * * *